Oct. 17, 1967     T. H. JOHNSTONE     3,347,584
VEHICLE CLOSURE LATCH

Filed March 19, 1965                                     2 Sheets-Sheet 1

INVENTOR.
Theodore H. Johnstone
BY
W. S. Pettigrew
ATTORNEY

INVENTOR.
Theodore H. Johnstone
BY
W. S. Pettigrew
ATTORNEY

United States Patent Office 3,347,584
Patented Oct. 17, 1967

3,347,584
VEHICLE CLOSURE LATCH
Theodore H. Johnstone, New Baltimore, Mich., assignor to General Motors Corporation, Detroit, Mich., a corporation of Delaware
Filed Mar. 19, 1965, Ser. No. 441,037
8 Claims. (Cl. 292—198)

This invention relates to closure latches and more particularly to a new and improved vehicle body closure latch.

The typical form of closure latch now conventionally used in vehicle bodies primarily comprises latch bolt means movable between a latched position in engagement with a cooperative striker and an unlatched position, and selectively releasable detent means engageable with abutments on the bolt means to prevent movement thereof from latched to unlatched positions. These latches have in the past been deliberately designed so that the cooperative abutments or shoulders on the detent means and the bolt means will engage in such a manner that any forced tendency of the bolt means to move from latched position against the detenting restraint thereon, as arising for example from closure seal pressures, will be positively counteracted by the detent means; that is, there will be no tendency toward forcing the detent means out of engagement with the bolt means. Where the seal or other forces are high, these prior latches are often even further provided with "cam-in" means, usually in the form of an angular relationship of the engaging shoulders, effective to cam the detent means even further into engagement with the bolt means.

While these prior arrangements provide for a positive detent, it often results that extremely high release forces are required to disengage the detent means and release the latch. This is always undesirable in terms of the forces required of manual latch actuators, and is especially disadvantageous when it is desired to release the latch through the agency of some form of power actuator, for example, a solenoid operable on the detent means. Such solenoids or other actuators have been required to be of very high output rating, and therefore quite costly, even sometimes to the point of prohibiting their general use.

It is therefore the primary object of this invention to provide a closure latch having new and improved detenting means minimizing the forces or energy required for release of the latch.

It is another object of this invention to provide a closure latch ideally suited for power actuation or release by an inexpensive power component of minimum required output.

It is a further object of this invention to provide a new and improved closure latch of the detented latch bolt type wherein the engaging detent abutments or shoulders on the bolt and on the detent means are engageable in such a manner as to provide for a very positive detent, yet minimize the forces required for release of the latch.

Still another object of this invention is to provide a new and improved closure latch including latch bolt means provided with first detent shoulder means, detent means including second detent shoulder means engageable with the first detent shoulder means in the latched position of the latch means, yet being so arranged therewith as to provide for a substantial force component operative to cam the shoulder means out of engagement under forced movement of the bolt means from the latched position, and movable blocking means operable to resist this force component and positively hold the shoulder means in engagement yet being selectively movable under minimum force to allow disengagement of the shoulder means and release of the latch.

Other objects, features and advantages of the invention will be readily apparent from the following specification and drawings wherein.

Figure 1:
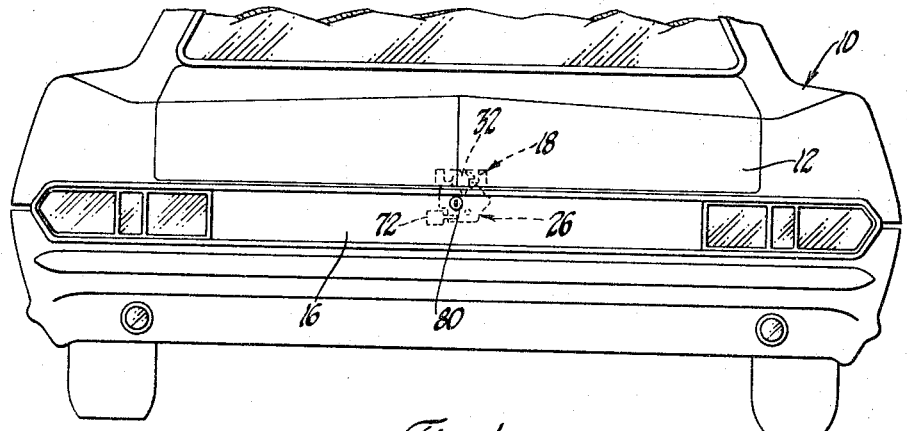
FIGURE 1 is a fragmentary rear elevational view of a vehicle body including a closure latch according to this invention and showing the latch in latched position.
Figure 2:
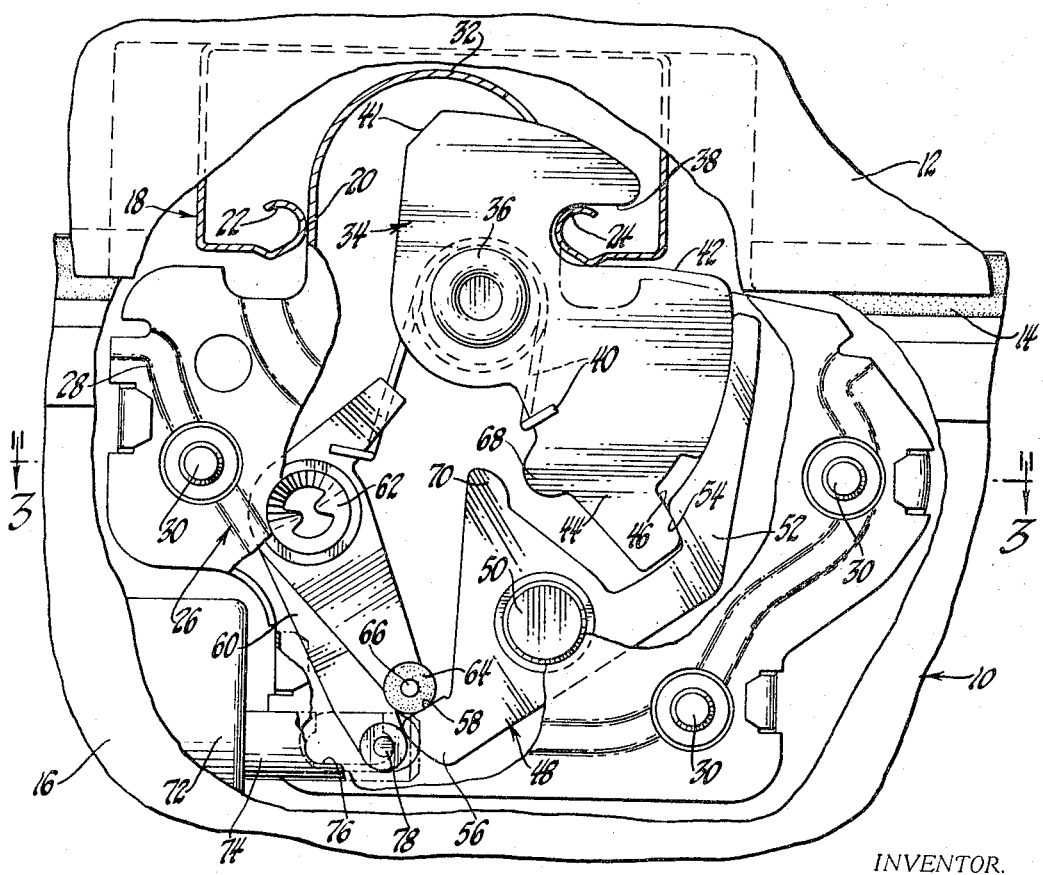
FIGURE 2 is an enlarged partially broken away view of a portion of FIGURE 1.

Referring now particularly to FIGURE 1 of the drawings, the closure latch of this invention is shown as applied in a deck lid installation of a vehicle body designated generally as 10. The deck lid 12 is conventionally hingedly mounted adjacent the forward edge thereof for swinging movement vertically and longitudinally of the body between a lowered or closed position as shown, and a raised or opened position, not shown. As seen best in FIGURE 2, the deck lid when closed engages and compresses a seal strip 14 which is conventionally mounted continuously around the deck opening on the opposite rear quarter panel structures and on the upper edge portion of the rear panel structure 16 of the body. A closure latch assembly according to this invention for releasably holding the deck lid in closed position includes a striker box 18 of generally well-known construction mounted to the inside of deck lid 12 adjacent the rearward lower edge thereof, and apertured at 20 as defined partially by a pair of opposed up-turned and curled flanges 22 and 24.

The closure latch proper, designated as 26, includes a hollow latch frame 28 bolted to the panel structure 16 as at 30. Frame 28 includes an upwardly extending guide nose portion 32 receivable in the aperture 20 of the striker box and snugly engageable between the opposed flanges 22 and 24 for firm transverse alignment of the deck lid when in its closed position. Nose 32 is suitably slotted at one side thereof to accommodate the rotation therethrough of a latch bolt 34 mounted within the frame 28 by a pivot stud 36. The portion of bolt 34 which travels through the aperture of nose 32 is forked or bifurcated at 38 for the firm embrace therewithin of the rightward flange 24 of the striker box. The bolt is rotatable about stud 36 between the latched position shown wherein it does so embrace the flange 24, and a counterclockwise-displaced unlatched position permitting withdrawal of the flange from portion 38 and upward movement of the deck lid. A coil torsion spring 40 is wound about stud 36 and anchored at one end thereof to an edge of the bolt to bias the bolt into unlatched position wherein a flat 41 on the bolt engages a side of nose 32 to provide a stop. When so located and when the deck lid 12 is in an opened position, subsequent movement of the deck lid downwardly causes a lower surface of the striker box adjacent flange 24 to engage a cam edge 42 of the bolt thereby to rotate the bolt against the action of spring 40 into latched position.

Figure 3:
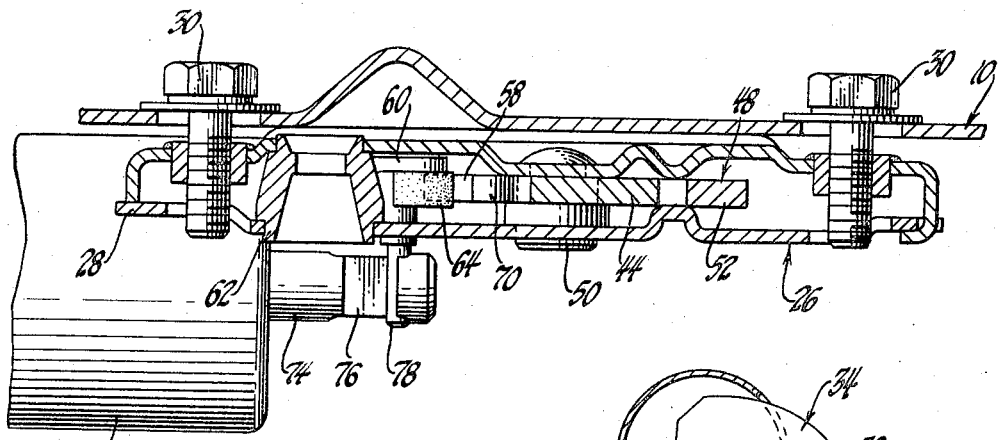
FIGURE 3 is a sectional view taken generally along the plane indicated by the line 3—3 of FIGURE 2.
Figure 5:
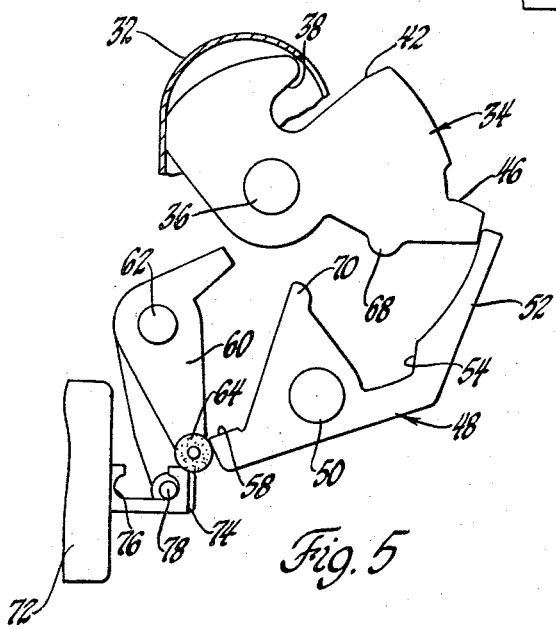
FIGURE 5 is a view similar to FIGURE 4 showing the parts in unlatched position.

Bolt 34 further includes an integral holding portion 44 whereon is formed a first abutment or detent shoulder 46. A detent lever 48 is pivoted within frame 28 by a stud 50 and includes a leg 52 formed with a second abutment or detent shoulder 54 detentingly engageable with shoulder 46 in the latched position of the bolt. An opposite leg 56 of the detent lever is formed with a blocking foot 58 cooperable with a blocking lever assembly including a blocking lever 60 received over and fixed to a centrally apertured roll-back member 62 journaled within frame 28, seen best in FIGURE 3. A pin 66 adjacent the lower end of lever 60 rotatably mounts a roller 64 of plastic or other suitable antifriction material, the roller being engageable with the foot 58 of the detent lever when the parts assume their latched and detenting position shown in FIGURE 2. A second leg of spring 40 is hooked over an upper ear of the blocking lever for bias thereof with roll-back 62 in a counterclockwise direction. With the roller 64 engaged on the foot, detent lever 48 is held in the detenting position shown, wherein the engaged shoulders 46 and 54 hold bolt 34 against counterclockwise rotation and hold the deck lid closed. As indicated in FIGURE 5, clockwise rotation of lever 60 disengages roller 64 from foot 58 and permits the detent lever to rotate clockwise to a nondetenting position wherein the bolt is permitted to rotate to unlatched position and the deck lid is permitted to move upwardly under the force of the compressed seal strip 14. As shown in FIGURE 5, when the bolt is so located, shoulder 46 engages leg 52 to hold the detent lever in nondetenting position. Upon subsequent movement of the deck lid to a closed position, the resulting clockwise rotation of bolt 34 causes engagement between a nose 68 on the holding portion 44 and a nose 70 on the detent lever, thereby imparting counterclockwise rotation to the detent lever into detenting position and permitting subsequent counterclockwise rotation of lever 60 and roller 64 into blocking position under the force of spring 40.

Having particular reference now to FIGURES 4 and 5, the positive detenting and minimum release characteristics of the aforedescribed closure latch construction of this invention will be explained. Shoulder 46 is preferably provided with a significant curvature such that when in detenting position, shoulder 54 engages shoulder 46 tangentially. This tangential engagement is indicated by the line E in FIGURE 4, and it is seen that any forces tending to rotate the bolt from latched to unlatched position, whether they be from the spring 40 or the substantial seal pressure of the compressed strip 14, will be directed perpendicularly of line E as shown by the force vector F. In prior latches, such a vector has been deliberately directed through the pivotal axis or other mounting of the detent lever, by forming the detent shoulders for engagement along a line perpendicular to a radius from such axis. Positive detenting results; that is, there is no tendency for the detent lever to cam out of engagement with the bolt under substantial forces seeking to rotate the bolt to unlatched position. However, the force required to release the detent shoulders has been necessarily high, being that force required to overcome the friction arising between the two shoulders under the perpendicular loading thereon.

Figure 4:
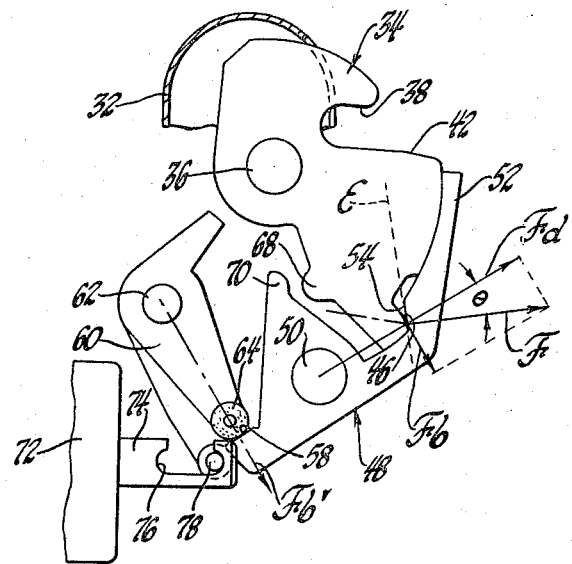
FIGURE 4 is a view showing certain of the primary operating parts of the latch that appear in FIGURE 2 and a force diagram obtaining therebetween when in latched position.

As seen in FIGURE 4, the detenting arrangement of the latch of this invention provides for resolution of the vector F into a first component $F_d$ through the axis of pivot stud 50, and a second component $F_b$. It is apparent that component $F_b$ is effective to cam shoulders 46 and 54 out of engagement. To hold the shoulders in engagement in opposition to the component $F_b$, a like reactionary force $F_b'$ obtains through the pivot axis of the lever 60. A positive detent is thus provided. It will, however, be seen that the release force required to effect disengagement of the roller 64 and foot 58 is only that force $F_b f$, where $f$ is the coefficient of whatever friction arises between the roller and foot. The release force is thus reduced over prior latches at least by the factor $\sin \theta$.

In addition, the use of a roller 64 of antifriction material substantially reduces the friction to that small amount arising between the roller and pin 66. Although it is preferred that the tangential engagement between the roller and the foot be nearly perpendicular to a radius from the pivot of lever 60, there may be provided a slight cam out tendency on the lever; that is, the tangential engagement may be arranged so that the reactionary force on foot 58 resolves into a component providing for a slight tendency of the roller 64 to cam out of engagement with foot 58, thereby to aid release effort applied to lever 60.

Taking advantage of these detenting characteristics, a solenoid 72 is suitably mounted on back panel 16 adjacent frame 28 and includes an armature 74 slotted at 76 for the reception of a pin 78 extending from the lower end of lever 60. The aforedescribed force diagram permits the use of the solenoid of minimum output rating and resulting low cost. By the introduction of the lever arm arising between the pin 78 and the pivotal axis of lever 60, the required output is even further reduced.

Similarly, the advantages of the detent force diagram obtain with respect to purely manual actuation of the latch. For example, a conventional key cylinder actuator, indicated at 80 in FIGURE 1, and conventionally coupled within the roll-back 62, requires only that manual turning force at the roll-back needed to overcome the friction in roller 64 arising from force $F_b$. Lever arms may of course also be introduced for the benefit of such a manual actuator, but it has been found that even with a seal force F in the order of 150–200 lbs. only very slight turning force is required at actuator 80 to release the latch.

Thus a new and improved closure latch is provided.

I claim:

1. A vehicle body closure latch comprising, latch means movable in a direction between latched and unlatched positions and including a first detent shoulder, detent means including a second detent shoulder engageable with said first detent shoulder in the latched position of said latch means, said shoulders being formed for engagement along a line so oriented with respect to the direction of movement of said latch means as to provide for a substantial force component effective to cam said shoulders out of engagement upon forced movement of said latch means from the latched to the unlatched position thereof, and means selectively operable upon said detent means to restrain the latter and positively hold said shoulders in engagement in opposition to said force component and prevent movement of said latch means from the latched position thereof.

2. A vehicle closure latch comprising, latch means rotatable about an axis between latched and unlatched positions and including a first detent shoulder, detent means including a second detent shoulder engageable with said first detent shoulder in the latched position of said latch means, said shoulders being formed for engagement along a line so oriented with respect to the direction of rotation of said latch means as to provide for a substantial force component effective to cam said shoulders out of engagement upon forced rotation of said latch means from the latched to the unlatched position thereof, and means selectively operable upon said detent means to restrain the latter and positively hold said shoulders in engagement in opposition to said force component and prevent movement of said latch means from the latched position thereof.

3. A vehicle closure latch comprising, latch means rotatable about an axis between latched and unlatched positions and including a first detent shoulder, detent means including a second detent shoulder engageable with said first detent shoulder in the latched position of said latch means, said shoulders being formed for engagement along a line so substantially divergently related with a radius from said axis to a point of said engagement as to provide for a substantial force component effective to cam said shoulders out of engagement upon forced rotation of said latch means from the latched to the unlatched position thereof, and blocking means selectively engageable with said detent means to hold said shoulders in engagement in opposition to said force component and prevent movement of said latch means from the latched position thereof.

4. A vehicle closure latch comprising, a latch bolt rotatable about an axis between latched and unlatched positions, holding means movable with said bolt and including a first detent shoulder, a detent lever pivotable about an axis between detenting and nondetenting positions and including a second detent shoulder engageable in detenting position with said first detent shoulder in the latched position of said bolt, said shoulders being formed for engagement along a line so angularly related at a point of said engagement with respect to either a radius from said axis of said bolt or a radius from said axis of said detent lever as to provide for a substantial force component effective to cam said shoulders out of engagement upon forced movement of said bolt from the latched to the unlatched position thereof, and blocking means selectively engageable with said detent lever to hold said shoulders in engagement in opposition to said force component and prevent movement of said bolt from the latched position thereof.

5. A vehicle closure latch comprising, a latch bolt, first means mounting said bolt for rotation about an axis between latched and unlatched positions, holding means movable with said bolt and including a first detent shoulder, a detent lever, second means mounting said lever for rotation about an axis between detenting and nondetenting positions, said lever including a second detent shoulder engageable in detenting position with said first detent shoulder in the latched position of said bolt, said shoulders being formed for engagement along a line so angularly related at a point of said engagement with respect to radii from both of said axes that a force moving said bolt from latched to unlatched position is resolved into a first substantial force component directed through said second mounting means and a second substantial force component effective to cam said shoulders out of engagement, and blocking means selectively engageable with said detent lever to hold said shoulders in engagement in opposition to said second force component and prevent movement of said bolt from the latched position thereof.

6. A vehicle closure latch as recited in claim 5 wherein said blocking means includes a blocking lever pivoted adjacent one end thereof for selective movement about an axis between a blocking position restraining movement of said detent lever and a nonblocking position.

7. A vehicle closure latch as recited in claim 6 and further including means for directing the resultant force in opposition to said second force component through said axis of said blocking lever, and relatively frictionless means on said blocking lever and said detent lever for establishing the engagement therebetween.

8. A vehicle closure latch comprising, a latch frame, a latch bolt including an integral first detent shoulder, first means mounting said bolt on said frame for rotation about an axis between latched and unlatched positions, a detent lever, second means mounting said detent lever intermediate the ends thereof on said frame for rotation about an axis between detenting and nondetenting positions, said detent lever including a second detent shoulder adjacent one end thereof engageable in detenting position with said first detent shoulder in the latched position of said bolt, said shoulders being formed for engagement along a line so angularly related at a point of said engagement with respect to radii from both of said axes that a force moving said bolt from latched to unlatched position is resolved into a first substantial force component directed through said second mounting means and a second substantial force component effective to cam said shoulders out of engagement, a blocking lever pivoted adjacent one end thereof on said frame for selective movement about an axis between a blocking position operative to hold said shoulders in engagement in opposition to said second force component and a nonblocking position, said blocking lever and said detent lever being arranged to direct the resultant force in opposition to said second force component through said axis of said blocking lever, antifriction roller means mounted adjacent the other end of said blocking lever for engagement with the other end of said detent lever, and means for selectively moving said blocking lever between said positions thereof.

References Cited
UNITED STATES PATENTS

| | | | |
|---|---|---|---|
| 2,504,364 | 4/1950 | Wagner et al. | 292—103 X |
| 2,881,021 | 4/1959 | Jacobson | 292—229 |
| 2,901,277 | 8/1959 | Anderson | 292 |
| 2,946,613 | 7/1960 | Roethel | 292 |

FOREIGN PATENTS 741,410  11/1955  Great Britain.

MARVIN A. CHAMPION, *Primary Examiner.*

J. R. MOSES, *Assistant Examiner.*